United States Patent [19]

Aoki et al.

[11] Patent Number: 4,583,768
[45] Date of Patent: Apr. 22, 1986

[54] FLEXIBLE EXHAUST COUPLING

[75] Inventors: Shigehiko Aoki; Shizuo Onotani, both of Hiroshima; Toshinobu Shimotaka, Kure; Yoshitaka Nakamura, Hiroshima, all of Japan

[73] Assignee: Mazda Motor Corporation, Hiroshima, Japan

[21] Appl. No.: 569,491

[22] Filed: Jan. 9, 1984

[30] Foreign Application Priority Data

Jan. 17, 1983 [JP] Japan .................................. 58-6343

[51] Int. Cl.$^4$ ............................................ F16L 53/00
[52] U.S. Cl. ...................................... 285/41; 285/267; 285/268; 285/DIG. 10
[58] Field of Search ................. 285/41, 261, 268, 267, 285/263, DIG. 10

[56] References Cited

U.S. PATENT DOCUMENTS

| | | | |
|---|---|---|---|
| 2,502,753 | 4/1950 | Rohr | 285/41 |
| 2,520,501 | 8/1950 | Guiler et al. | 285/41 |
| 4,097,071 | 6/1978 | Crawford et al. | 285/267 X |
| 4,165,107 | 8/1979 | Affa et al. | 285/41 |
| 4,188,784 | 2/1980 | Hall | 285/268 X |

FOREIGN PATENT DOCUMENTS 148014 9/1982 Japan .

OTHER PUBLICATIONS

Sparta Mfg. Co., Dover, Ohio, Teflon brochure, 1960.

Primary Examiner—Richard J. Scanlan, Jr.
Attorney, Agent, or Firm—Burns, Doane, Swecker and Mathis

[57] ABSTRACT

A flexible exhaust coupling comprising first and second passage elements, the first passage element being fluid-connected to the engine for receiving the exhaust gases to be discharged from an automobile engine through the second passage element, and a ring seal member having a spherical sealing surface and carried by one of the first and second passage elements, the other of the first and second passage elements having a mating spherical surface. The first and second passage elements are resiliently urged by springs in a direction close towards each other to permit the spherical sealing surface to gas-tightly and slidingly contact the mating spherical surface thereby constituting a resiliently yieldable joint between the first and second passage elements, and at least one air channel is defined exteriorly of the ring seal member for the passage of cooling air to forcibly cool the ring seal member. The inlet and an outlet of the channel are located and opened at respective regions where a pressure difference can be developed when an automobile vehicle moves in one direction such that wind induced by the movement of the vehicle can flow through the channel from the inlet to the outlet by the effect of the pressure differential therebetween.

9 Claims, 5 Drawing Figures

FLEXIBLE EXHAUST COUPLING

BACKGROUND OF THE INVENTION

This invention generally relates to a flexible coupling between pipe segments and, more particularly, to a flexible coupling utilizeable in the exhaust system of an automobile power plant.

The U.S. Pat. Nos. 4,097,071 and 4,188,784, patented June 27, 1978 and Feb. 19, 1980, respectively, disclose a high temperature resistant flexible coupling which comprises a spherically surfaced ring seal supported between a tubular end of a first pipe and a free end spherical surface on a second pipe. The second pipe has a flange, and a pair of bolts are resiliently coupled to the flange on the first pipe so as to urge the spherical lip against a high temperature lubricant surface on the ring seal to define a joint so that it readily accommodates substantial angular offset between the first and second pipes while maintaining a positively sealed surface at the joint.

In particular, in the first mentioned U.S. patent, the flanges connected together by the bolts are rigidly mounted on the first and second pipes by the use of a welding technique, the flange on the second pipe being positioned rearwardly of the free end spherical surface with respect to the direction towards the first pipe.

In the second mentioned U.S. patent, the flange on the second pipe is shown to be integrally formed therewith and positioned so as to surround the free end spherical surface. This flange on the second pipe is coupled to the flange on the first pipe by the bolts through a collar mounted on the first pipe on one side of such flange opposite to the tubular end.

A similar flexible coupling is also disclosed in the Japanese Laid-open Utility Model Publication No. 57-148014, laid open to public inspection on Sept. 17, 1982. In this flexible coupling, the flanges on the first and second pipes are shown to have been rigidly mounted thereon by the use of a welding technique, respectively, and that annular portion of the ring seal which is delimited generally between the flanges and is exposed to the outside is radially inwardly recessed so as to define a circumferentially extending groove for minimizing any possible intrusion of foreign matters, such as water and/or mud, into the joint.

The use of conical coil springs one for each bolt for coupling the flanges on the first and second pipes together in a resiliently yieldable manner relative to each other is disclosed in the first mentioned U.S. patent and the Japanese publication.

The flexible exhaust coupling disclosed in all of these prior art references is satisfactory and effective in that the first and second pipes are permitted a relative jolt about the joint, thereby making the pipes yieldable to vibrations transmitted to the pipe system from the engine in operation and/or through the automobile body running on a rough road, without substantially destroying the sealed relationship between these pipes at the joint. However, it has been found that the ring seal is susceptible to damage when subjected to a thermal history for a substantial period of time. More specifically, in the prior art flexible exhaust couplings, the ring seal is generally made of graphite coated exteriorly with a layer of fluoroplastics. Although the fluoroplastic layer facilitates a smooth relative movement between the ring seal and the mating spherical surface on the free end of the pipe while maintaining a gas sealed relationship therebetween, the fluoroplastics itself has a tendency of being decomposed when heated to about 350° C.

On the other hand, because the ring seal is heated not only by the exhaust gas flowing through the pipe system, but also by a friction heat evolved at the spherical joint, it often happens that the maximum temperature of the ring seal may raise to about 420° C. Once the ring seal is heated to such a temperature, the fluoroplastic layer exfoliates from the body of graphite upon decomposition thereof with both the smooth relative movement and the gas sealed relationship consequently affected adversely. In addition, since the exfolication of the fluoroplastic layer permits the body of graphite, contact metal forming the pipe, a rattling sound will be generated from the flexible coupling as a result of the cumulative effect of vibrations and the direct contact of the graphite body with the pipe, and the flexible coupling may consequently be damaged earlier than its normal lifetime.

The problems described hereinabove may equally occur even when the flexible coupling of the construction described hereinbefore is utilized between the pipe and a catalytic converter.

SUMMARY OF THE INVENTION

This invention has been developed with a view to substantially eliminating the above describe disadvantages and inconveniences inherent in the prior art flexible exhaust couplings and has for its essential object to provide an improved exhaust coupling wherein the possibility is minimized, or substantially eliminated, of the ring seal being heated to a temperature exceeding the maximum allowable one.

Another important object of this invention is to provide an improved flexible exhaust coupling of the type referred to above, which is therefore durable and can operate for a substantially prolonged period of time in the high temperature environment.

A further object of this invention is to provide an improved flexible exhaust coupling of the type referred to above, which can be easily and readily fabricated using currently available materials and procedures and, hence, without substantially increasing the number of component parts and with no need to employ time-consuming and expensive procedures.

A still further object of the present invention is to provide an improved flexible exhaust coupling of the type referred to above, wherein a relatively large freedom of choice of material may be appreciated for the ring seal.

According to this invention, the above described objects can be accomplished by providing the flexible exhaust coupling with at least one channel for the flow of a stream of cooling air induced primarily during the run of an automobile vehicle. The channel is generally defined circumferentially exteriorly of the ring seal and between the flanges, in the case of a pipe-to-pipe connection, or in one end wall in the case where the pipe is connected with an automobile catalytic converter, and has an inlet and an one outlet. The inlet and the outlet are located at respective positions where a pressure differential is created in the stream of cooling air across the channel such that the air entering the channel through the inlet can be drawn outwards from the outlet after having flowed through the channel. The stream of cooling air during its flow through the channel forcibly cools the ring seal to suppress the increase of the temperature of the ring seal by the action of heat exchange between the air stream and the ring seal.

The inlet may be a plurality of perforations defined in one of the flanges or an annular opening defined circumferentially between the flanges. Likewisely, the outlet may be a plurality of perforations defined in the other of the flanges or an annular opening defined circumferentially between the flanges. In the case of the resiliently yieldable connection of the pipe to the end wall of the catalytic converter, the use of plural channels having inlets and outlets each equal in number to the channel is preferred. In such case, the channels may be defined in the end wall while the inlet and outlet for each channel are constituted by the opposite ends of the respective channel.

The system of this invention may be referred to as a forced draft cooling system and, as such, the ring seal can be forcibly cooled to suppress the increase of the temperature thereof.

BRIEF DESCRIPTION OF THE DRAWINGS

These and other objects and features of this invention will become apparent from the following description taken in conjunction with preferred embodiments thereof with reference to the accompanying drawings, in which.

DETAILED DESCRIPTION OF THE EMBODIMENT

Figure 1:
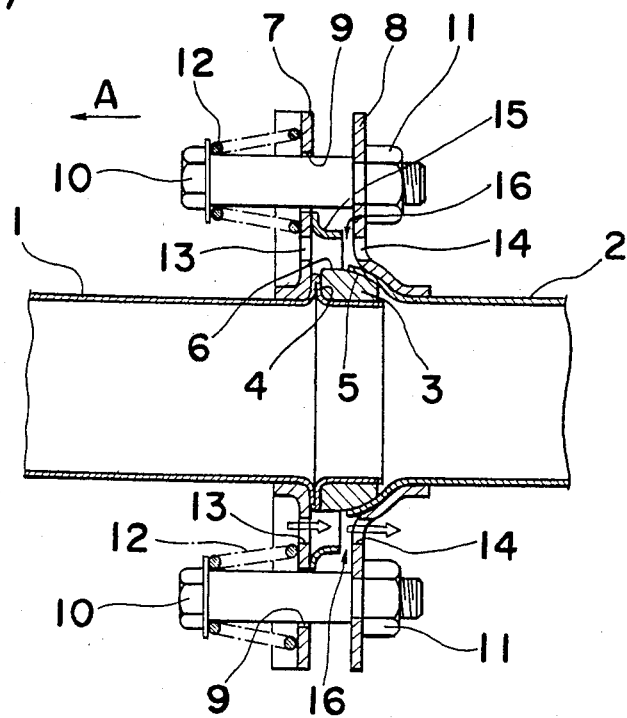
FIG. 1 is a longitudinal sectional view of a flexible exhaust coupling according to a first embodiment of this invention shown as used to connect separate pipes together.

Before the description of this invention proceeds, it is to be noted that like parts are designated by like reference numerals throughout the accompanying drawings.

Referring first to FIG. 1, an automobile exhaust system for the discharge of exhaust gases from the engine to the atmosphere extends beneath the body of an automotive vehicle in a direction rearwardly of the direction of forward run, as indicated by the arrow A, of the vehicle and, so far shown, comprises a front pipe 1 located adjacent the engine, and a rear pipe 2 located on one side of the front pipe 1 remote from the engine, which rear pipe 2 may be communicated either direct to the atmosphere or to the atmosphere through any known exhaust gas purifying unit such as a catalytic converter and/or an afterburner. The front and rear pipes 1 and 2 are fluid-connected with each other through a flexible coupling that permits a relative jolt of these pipes 1 and 2 while maintaining a gas-tight seal therebetween.

The flexible coupling shown in FIG. 1 comprises a ring seal or sealing annulus 3 interposed operatively between the front and rear pipes 1 and 2 and preferably made in the form of a graphite impregnated woven stainless-steel mesh having its exterior surface coated with a fluoroplastic layer. As best shown, the front pipe 1 has a radially outwardly protruding retainer 4 defined circumferentially thereof by crimping a portion of the front pipe 1 adjacent its rear end in a direction axially inwardly while allowing that portion of the front pipe 1 to protrude radially outwardly. The sealing annulus 3, mounted on the rear end of the front pipe 2, is seated against the retainer 4 and has a spherical sealing surface 6 confronting and slidingly sealed to a front end of the rear pipe 2 adjacent the front pipe 1 in a manner as will now be described.

The front end of the rear pipe 2 is radially outwardly flared to provide a spherical cup having a free end spherical surface 5 cooperable with the spherical sealing surface 6 of the sealing annulus 3.

On one side of the retainer 4 opposite to the sealing annulus 3, a front clamping flange 7 is rigidly mounted on the front pipe 1 and seated against the retainer 4 so as to extend radially outwardly of the front pipe 1. A similar rear clamping flange 8 is rigidly mounted on the rear pipe 2 so as to extend radially outwardly from the spherical cup at the front end of the rear pipe 2. The flanges 7 and 8 on the front and rear pipes 1 and 2, respectively, are spacedly connected together by means of at least two shoulder bolts 10 spaced 180° C. from each other about the pipe system. Each of the shoulder bolts 10 extend through a bolt hole 9 in the flange 7, has a screw threaded end of reduced diameter that extends through a bolt hole in the flange 8 and is secured in position by a nut 11 while an annular shoulder of the respective bolt 10 is seated against the flange 8. The front clamping flange 7 so connected with the rear clamping flange 8 is yieldingly urged against the latter by means of conical coil springs 12 each arranged around the respective bolt 10 and interposed between the head of the respective bolt 10 and the front clamping flange 7. Since the front clamping flange 7 is rigidly mounted on the front pipe 1 while seated against the retainer 4, the yieldable displacement of the flange 7 against the flange 8 by the action of the springs 12 is accompanied by a gas-tight and sliding contact of the spherical sealing surface 6 of the sealing annulus 3 to the free end spherical surface 5 on the rear pipe 2.

The flexible exhaust coupling of the construction so far described hereinbefore is well known to those skilled in the art and generally disclosed in the previously mentioned prior art references, particularly, the Japanese publication No. 57-148014. However, in accordance with the teachings of this invention, a forced draft cooling system is employed in the flexible coupling for forcibly cooling the sealing annulus 3 during the forward run of the vehicle, which cooling system will now be described.

The front clamping flange 7 has a plurality of air intake perforations 13 defined therein at respective locations around the front pipe 1 and radially inwardly of the imaginary circle coaxial with the pipe system and occupied by the bolts 10. These air intake perforations 13 are communicated with the space between the flanges 7 and 8 and exteriorly of the sealing annulus 3 for the introduction of a cooling air thereinto during the forward run of the vehicle. For discharging the cooling air used to effect the heat exchange with the sealing annulus 3, a plurality of air discharge perforations 14 are defined in the rear clamping flange 8 in a circle coaxial with the pipe system and in alignment with the circle depicted by the air intake perforations 13. The number of the air discharge perforations 14 may be equal to, smaller than or greater than that of the air intake perforations 13. In addition, the employment of one air intake perforation in the flange 7 and one discharge perforation in the flange 8 may also be possible, and in such case the air intake perforation is preferred to be circumferentially spaced 180° C. from each other about the pipe system.

For guiding the air, entering the space between the flanges 7 and 8 through the air intake perforations 13, towards the air discharge perforations 14 without substantially permitting it to flow radially outwardly through the space between the flanges 7 and 8 induced by the air current flowing exteriorly of the flanges 7 and 8, a shielding barrel 15 is utilized. This shielding barrel 15 has one end rigidly secured to one of the flanges 7 and 8, for example, the flange 7 so far shown, with the other end terminating at a position spaced a distance from the other of the flanges, that is, the flange 8, said distance of spacing being selected in consideration of the angle through which the pipe 1 is permitted to bend relative to the pipe 2. The shielding barrel 15 is of an internal diameter sufficient to cover the perforations 13 and 14 within the inside thereof so as to constitute an air flow channel 16 between the flanges 7 and 8.

It will readily be seen that, during the forward run of the vehicle in the direction A, a wind is created relative to the vehicle and, hence, the flanges 7 and 8, flowing in a direction counter to the direction A, and that a higher pressure therefore prevails forwardly of the flange 7 with respect to the direction A than rearwardly of the flange 8. Consequently, the cooling air entering into the space, defined between the flanges 7 and 8 and radially inwardly of the shielding barrel 15, through the air intake perforations 13 can, after having been used for the heat exchange with the sealing annulus 3 to cool the latter, be forcibly drawn towards the discharge perforations 14 and then towards the atmosphere by the effect of the pressure differential. Thus, the air intake and discharge perforations 13 and 14 open at respective locations where a pressure differential can be created in the flow of cooling air across the channel 16.

In the construction described hereinabove with reference to FIG. 1, since the sealing annulus 3 on the rear end of the front pipe 1 is spherically engaged to the front end of the rear pipe 2 in a resiliently yieldable and gas-tight fashion, the front and rear pipes 1 and 2 are capable of jolting relative to each other to accommodate vibrations applied thereto during the run of the vehicle, thereby minimizing the possible breakage of the joint therebetween. However, when in use, the sealing annulus 2 is subjected to two sources of heat; the heat originating from the high temperature exhaust gases flowing through the pipes 1 and 2 across the joint, and the heat evolved by the frictional movement of the sealing annulus 3 relative to the spherical surface 5 on the pipe 2. Even though the sealing annulus 3 is heated by these heats, the cooling air flowing from the air intake perforations 13 to the discharge perforations 14 across the channel 16 effectively cools the sealing annulus 3 as it passes in touch with the outer peripheral portion thereof, and therefore, the unnecessary increase of the temperature of the sealing annulus 3 can advantageously be suppressed. In addition, the presence of the shielding barrel 15 effectively minimizes the radially outward escape of the cooling air having entered the space between the flanges 7 and 8 through the intake perforations 13, thereby enhancing the cooling of the annulus 3.

In the foregoing embodiment, the inlet leading to the channel 16 has been described as constituted by the intake perforations 13 defined in the flange 7 and arranged in the circle around the front pipe 1 while the channel 16 has been shown as configured so as to generally extend in parallel to the pipe system across the joint. However, the inlet of the channel 16 may be constituted by one opening while the channel 16 is configurated so as to extend radially inwardly, the embodiment of which will be hereinafter described with reference to FIG. 2.

Figure 2:
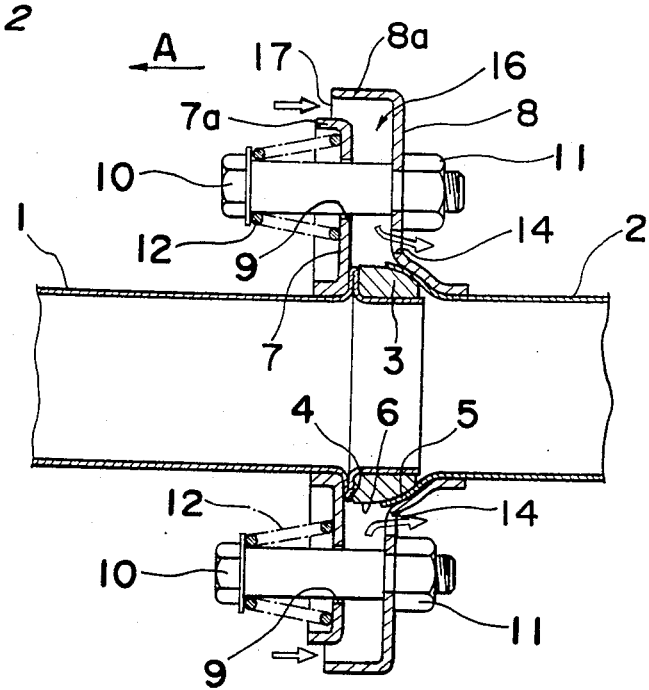
FIGS. 2 and 3 are views similar to FIG. 1, showing second and third of this invention.

Referring now to FIG. 2, the front and rear clamping flanges 7 and 8 have respective flange extensions 7a and 8a formed integrally with, or otherwise rigidly connected to, the outer peripheral edges thereof so as to protrude in a direction conforming to the direction A of forward run of the vehicle or towards the upstream side with respect to the flow of the exhaust gases through the pipe system across the joint between the pipes 1 and 2, and generally perpendicular to the flanges 7 and 8. The flange extensions 7a and 8a define an annular air intake opening 17 therebetween, which opening 17 is communicated with the channel 16 configurated consequently so as to extend radially inwardly towards the discharge perforations 14 between the flanges 7 and 8.

The embodiment of this invention described with reference to and shown in FIG. 2 is advantageous in that, since the cooling air entering the channel 16 through the annular intake opening 17 generally flows radially inwardly and then impinges upon the sealing annulus 3 before it emerges outwardly from the discharge perforations 14, a relatively high cooling effect can be appreciated. In addition, since the inlet of the channel 16, that is, the annular intake opening 17, is located spaced a distance radially outwardly from the pipe system, not only can a relatively large amount of the cooling air be introduced into the channel 16, but also the cooling air ready to enter the annular intake opening 17 can be kept relatively low in temperature without being affected by the heat drifting in the proximity of the outer periphery of the pipe system. The bolts 10 can also be cooled in contact with the radially inwardly flowing cooling air in the channel 16.

In the foregoing embodiments shown in FIGS. 1 and 2, respectively, the inlet and the outlet of the channel 16 have been described and shown as opening towards the upstream and downstream sides, respectively, with respect to the direction of flow of the exhaust gases through the pipe system. However, the pressure differential necessary to allow the cooling air to be forced through the channel from the inlet to the outlet can be created even on one of the upstream and downstream sides of the flexible coupling. The embodiment shown in FIG. 3 illustrates the inlet and outlet of the channel oriented towards the downstream side of the flexible coupling, the details of which will now be described.

Figure 3:
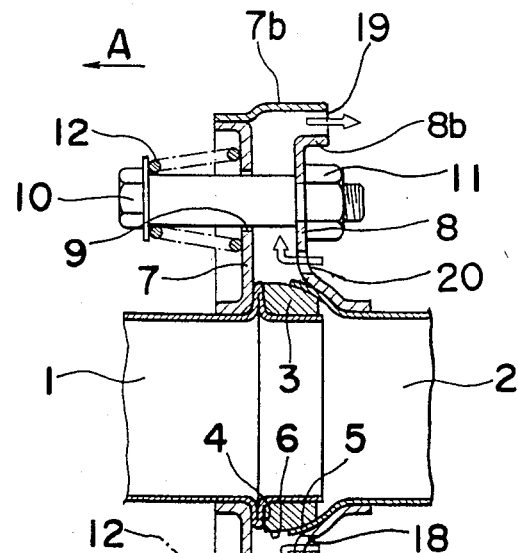

As shown in FIG. 3, the perforations in the rear clamping flange 8, which have been described in the foregoing embodiment as constituting the outlet of the channel 16, constitute the inlet of the channel 16 and, hence, the air intake perforations 20. The outlet of the channel 16 is constituted by an annular discharge opening 19 facing towards the downstream side with respect to the flow of the exhaust gases and in a direction counter to the direction A of forward run of the vehicle. This discharge opening 19 is defined by flange extensions 7b and 8b integrally formed with, or otherwise rigidly connected to the outer peripheral edges of the respective flanges 7 and 8 so as to protrude generally at right angles thereto, in a manner substantially similar to the flange extensions 7a and 8a in the embodiment of FIG. 2. So far shown, the flange extension 7b is rigid on the flange 7, but the flange extension 8b is integral with the flange 8. As is the case with the discharge perforations 14 in the foregoing embodiments of FIGS. 1 and 2, the intake perforations 20 are arranged in a circle about and adjacent the rear pipe 2 and radially inwardly of the imaginary circle occupied by the shoulder bolts 10.

In the embodiment shown in FIG. 3, it will readily be seen that, when and so long as the vehicle runs in the forward direction A, the air flows relatively over the perimeter of the flexible coupling and exteriorly of the flange extension 7b, creating adjacent the annular discharge opening 19 a region of lower pressure than the pressure at a region adjacent the intake perforations 20. Therefore, by the action of the reduced pressure prevailing at the region adjacent the discharge opening 19, the cooling air is drawn into the channel 16 through the intake perforations 20 and, after having flowed through the channel 16, is then drawn outwards through the discharge opening 19, as shown by the blank arrows. As is the case with the embodiment shown in FIG. 2, with the construction shown in FIG. 3, not only can the sealing annulus 3 be forcibly cooled in a manner similar to that described hereinbefore, but the bolts 10 can also be cooled. Moreover, since the flexible coupling has no opening confronting the direction counter to the direction of flow of the wind induced by the relative movement of the flexible coupling, any possible intrusion of foreign matters into the channel 16 can advantageously be minimized.

The flexible coupling according to any one of the embodiment shown in FIGS. 1 to 3, respectively, can be utilized not only for connecting the front and rear pipes 1 and 2 together, but also for connecting the catalytic converter to the front pipe 1. The connection of the catalytic converter to the front pipe 1 through the flexible coupling may be made either by way of the rear pipe 2 or directly without utilizing the rear pipe 2. The direct connection of the catalytic converter to the front pipe 1 is illustrated in FIGS. 4 and 5.

Figure 5:
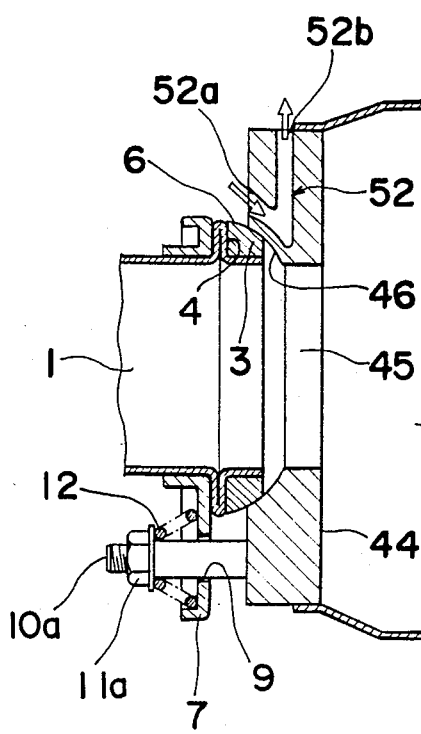
FIG. 5 is a cross-sectional view taken along the line V—V in FIG. 4.
Figure 4:
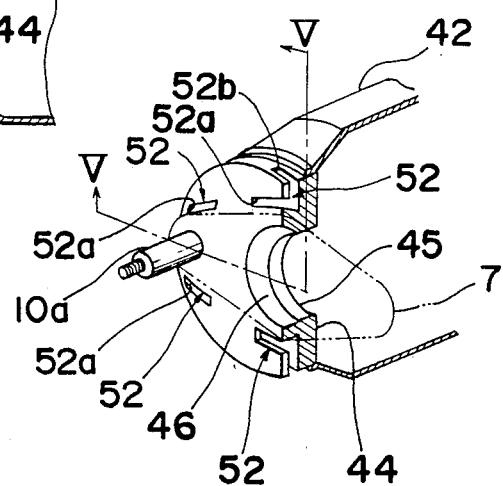
FIG. 4 is a perspective view of a portion of a catalytic converter, with one of the longitudinal halves removed, showing the flexible exhaust coupling used to connect a pipe to the catalytic converter according to a fourth embodiment invention.

Referring now to FIGS. 4 and 5, the catalytic converter of any known construction is generally identified by 42 and is shown as having an end wall 44 of substantial thickness having an exhaust inlet 45 defined therein completely through the thickness thereof. The end wall 44 also has a spherical surface 46 defined at one of the opposite inner peripheral edge portions thereof confronting the front pipe 1, to which surface 46 the spherical sealing surface 6 of the sealing annulus 3 is gas-tightly and slidingly engaged. For resiliently yieldingly connecting the flange 7 to the end wall 44, the bolts passing through the bolt holes 9 with the conical coil springs 12 interposed between the flange 7 and the respective heads of the bolts, in a manner substantially similar to that shown in FIGS. 1 to 3, may be threadingly engaged to the end wall 44. However, in the illustrated embodiment shown in FIGS. 4 and 5, stud bolts 10a are employed each having one end threadingly anchored to, or welded to or integrally formed with, the end wall 44 and the other end threadingly receiving a respective nut 11a with the corresponding conical coil spring 12 interposed between the nut 11a and the flange 7. It is to be noted that for the purpose which will become readily understood later, the flange 7 employed in the embodiment of FIGS. 4 and 5 is of generally rhombic shape as shown by the chain line in FIG. 4 with the bolt holes 9 defined at respective regions adjacent the opposite acute-angled portions thereof.

A plurality of channels 52 for the flow of the cooling air are formed in the end wall 44 with their air intake openings 52a and discharge openings 52b open at one end face of the wall 44 adjacent the flexible coupling and at the outer peripheral face thereof, respectively. As best shown in FIG. 4, the intake openings 52a leading to the respective channels 52 and open at the end face of the end wall 44 are arranged so as to surround the perimeter of the flange 7. In addition, some of the channels 52 which are defined adjacent the opposite obtuse-angled portions of the flange 7 and therefore located closest to the sealing annulus 3 have a portion inclined generally along the spherical surface 46 from the respective intake openings 52a, leaving a thin-walled region between the respective channels 52 and the sealing annulus 3 contacting the spherical surface 46 as best shown in FIG. 5.

In the embodiment shown in and described with reference to FIGS. 4 and 5, it will be readily seen that, when in use, the pressure acting at a region frontwardly of the end wall 44 is higher than that at a region adjacent the outer periphery of the same end wall 44 and, therefore, the cooling air entering the channels 52 through the intake openings 52a is, after passing through the channels 52, drawn outwards from the discharge openings 52b. In particular, the cooling air flowing through said some of the channels adjacent the opposite obtuse-angled portions of the flange 7 acts not only to cool the end wall 44, but also to cool the sealing annulus 3 through the thin-walled regions, while the air flowing the remaining channels 52 acts to cool the end wall 44. The cooling of the end wall 44 in turn cools the sealing annulus 3. It is also to be noted that the air ready to enter said some of the channels 52 contacts an annular portion of the sealing annulus 3 which is exposed to the outside without being covered by the spherical surface 46 and, therefore, that annular portion of the sealing annulus 3 can be cooled directly.

The channels 52 in the end wall 44 can be formed by the use of any known machining process or by the use of any known casting technique.

From the foregoing full description of this invention, it has now become clear that, since the air is forced to flow through the channel or channels for the ultimate purpose of cooling the sealing annulus used in the flexible coupling, by the effect of the pressure difference, for a given material for the sealing annulus, the durability and the relative heat resistance of the flexible coupling according to this invention can be improved as compared with the prior art flexible couplings. Moreover, since the sealing annulus can be kept relatively cool, the relative sliding movement between the spherical sealing surface of the annulus and the mating free end spherical surface at the joint takes place smoothly for a prolonged period of time without substantially destroying the sealed relationship therebetween.

Although this invention has thus fully been described in connection with the preferred embodiments thereof with reference to the accompanying drawings, it is to be noted that various changes and modifications are apparent to those skilled in the art. By way of example, because of the employment of the forced draft cooling system, the material for the sealing annulus may not be limited to that described, but may be a more inexpensive one.

Accordingly, unless such changes and modifications depart from the scope of this invention as defined by the appended claims, they are to be construed as included therein.

We claim:

1. In an exhaust system for an automobile engine for the discharge of exhaust gases from the engine to the atmosphere, a flexible exhaust coupling comprising:

first and second tubular passage elements each having first and second ends opposite to each other, the first ends of the respective first and second passage elements resiliently yieldably connected together whereas the second end of the first passage is fluid-connected with the engine for receiving the exhaust gases to be discharged;

a synthetic-resin coated ring seal member mounted exteriorly on the first end of one of the first and second passage elements and having a spherical sealing surface defined therein so as to confront the other of the first and second passage elements, the first end of said other of the first and second passage elements being radially outwardly flared to provide a mating spherical surface for the receipt of, and sliding engagement with, the spherical sealing surface of the ring seal member;

a first flange providing rigidly on said one of the first and second passage elements so as to extend radially outwardly therefrom and positioned on one side of the ring seal member remote from said other of the first and second passage elements, said first flange having a first air passage defined therein adjacent to and radially outwardly of the ring seal member;

a second flange provided rigidly on said other of the first and second elements so as to extend radially outwardly therefrom and positioned on one side of the mating spherical surface remote from said one of the first and second passage elements, said second flange having a second air passage defined therein adjacent to, and radially outwardly of, the radially outwardly flared first end of said other of the first and second passage elements; and means for resiliently connecting the first and second flanges together while urging the first and second flanges in a direction close towards each other to permit the spherical sealing surface to gas-tightly and slidingly contacting the mating spherical surface thereby constituting a resiliently yieldable joint between the first and second passage elements.

2. A coupling as claimed in claim 1, wherein the synthetic resin is fluoroplastics.

3. A coupling as claimed in claim 1, wherein said one of the first and second passage elements is the first passage elements, and said other of the first and second passage elements is the second passage element, and wherein the first end of the first passage element with the ring seal member rigidly mounted thereon protrudes a predetermined distance axially outwardly from the ring seal member.

4. A coupling as claimed in claim 3, wherein said connecting means comprises at least two elongated anchor members and coiled springs equal in number to the anchor members.

5. A coupling as claimed in claim 4, wherein each of said anchor members has one end connected to the second flange and the other end situated on one side of the first flange remote from the second flange, a substantially intermediate portion of said respective anchor member being loosely passed through the first flange, and wherein the coiled springs are mounted exteriorly on the respective anchor members and positioned between the first flange and the other ends of the respective anchor members.

6. In an exhaust system for an automobile engine for the discharge of exhaust gases from the engine to the atmosphere, a flexible exhaust coupling comprising:

first and second passage elements each having a tubular opening defined therein, said first passage element being fluid-connected to the engine for receiving the exhaust gases to be discharged through the second passage element;

a ring seal member having a spherical sealing surface defined therein and carried by one of the first and second passage elements, the other of the first and second passage elements having a mating spherical surface defined therein around the tubular opening thereof;

means for loosely connecting the first and second passage elements together with the spherical sealing surface being permitted to confront the mating spherical surface;

means for resiliently urging the first and second passage elements in a direction close towards each other to permit the spherical sealing surface to gas-tightly and slidingly contact the mating spherical surface thereby constituting a resiliently yieldable joint between the first and second passage elements;

means defining at least one air channel between the first and second passage elements and exteriorly of the ring seal member for the passage of cooling air to forcibly cool the ring seal member, said air channel having an inlet and an outlet, said inlet and outlet being located and opened at respective regions where a pressure difference can be developed when an automobile vehicle moves in one direction such that wind induced by the movement of the vehicle can flow through the channel from the inlet to the outlet by the effect of the pressure differential therebetween;

said first and second passage elements are constituted by first and second pipe segments, respectively, and said connecting means comprises first and second flanges rigidly mounted on and radially outwardly extending from the respective first and second pipe segments with the ring seal member located therebetween;

said one of the first and second passage elements is the first passage element and, hence, the first pipe segment, wherein said first and second flanges together constituting said channel defining means with the channel defined therebetween, and wherein said inlet of the channel is constituted by a plurality of air intake perforations defined in the first flange in a circle concentrical with and adjacent the ring seal member and said outlet of the channel is constituted by a plurality of discharge perforations defined in the second flange in a circle concentrical with and adjacent the ring seal member; and wherein the channel defining means include a guide barrel having one end secured to the first flange while surrounding the intake perforations, protruding therefrom towards the second flange and terminating at a location spaced a distance inwardly from the second flange, said guide barrel being operable to guide the cooling air entering the channel through the intake perforations towards the discharge perforations.

7. In an exhaust system for an automobile engine for the discharge of exhaust gases from the engine to the atmosphere, a flexible exhaust coupling comprising:

first and second passage elements each having a tubular opening defined therein, said first passage element being fluid-connected to the engine for receiving the exhaust gases to be discharged through the second passage element;

a ring seal member having a spherical sealing surface defined therein and carried by one of the first and second passage elements, the other of the first and second passage elements having a mating spherical surface defined therein around the tubular opening thereof;

means for loosely connecting the first and second passage elements together with the spherical sealing surface being permitted to confront the mating spherical surface;

means for resiliently urging the first and second passage elements in a direction close towards each other to permit the spherical sealing surface to gas-tightly and slidingly contact the mating spherical surface thereby consituting a resiliently yieldable joint between the first and second passage elements;

means defining at least one air channel between the first and second passage elements and exteriorly of the ring seal member for the passage of cooling air to forcibly cool the ring seal member, said air channel having an inlet and an outlet, said inlet and outlet being located an opened at respective regions where a pressure difference can be developed when an automobile vehicle moves in one direction such that wind induced by the movement of the vehicle can flow through the channel from the inlet to the outlet by the effect of the pressure differential therebetween;

said first and second passage elements are constituted by first and second pipe segments, respectively, and said connecting means comprises first and second flanges rigidly mounted on and radially outwardly extending from the respective first and second pipe segments with the ring seal member located therebetween;

wherein said one of the first and second passage elements is the first passage element and, hence, the first pipe segment, wherein said first and second flanges together constituting said channel defining means with the channel defined therebetween, and wherein said inlet of the channel is constituted by an annular intake opening defined by and between the outer peripheral portions of the respective first and second flanges so as to face in a direction conforming to the direction of forward run of the vehicle and said outlet of the channel is consistuted by a plurality of discharge perforations defined in the second flange in a circle concentric with and adjacent the ring seal member.

8. In an exhaust system for an automobile engine for the discharge of exhaust gases from the engine to the atmosphere, a flexible exhaust coupling comprising:

first and second passage elements each having a tubular opening defined therein, said first passage element being fluid-connected to the engine for receiving the exhaust gases to be discharged through the second passage element;

a ring seal member having a spherical sealing surface defined therein and carried by one of the first and second passage elements, the other of the first and second passage elements having a mating spherical surface defined therein around the tubular opening thereof;

means for loosely connecting the first and second passage elements together with the spherical sealing surface being permitted to confront the mating spherical surface;

means for resiliently urging the first and second passage elements in a direction close towards each other to permit the spherical surface to gas-tightly and slidingly contact the mating spherical surface thereby constituting a resiliently yieldably joint between the first and second passage elements;

means defining at least one air channel between the first and second passage elements and exteriorly of the ring seal member for the passage of cooling air to forcibly cool the ring seal member, said air channel having an inlet and an outlet, said inlet and outlet being located and opened at respective regions where a pressure difference can be developed when an automobile vehicle moves in one direction such that wind induced by the movement of the vehicle can flow through the channel from the inlet to the outlet by the effect of the pressure differential therebetween;

said first and second passage elements are constituted by first and second pipe segments, respectively, and said connecting means comprises first and second flanges rigidly mounted on and radially outwardly extending from the respective first and second pipe segments with the ring seal member located therebetween;

wherein said one of the first and second passage elements is the first passage element, and, hence, the first pipe segment, wherein said first and second flanges together constituting said channel defining means with the channel defined therebetween, and wherein said inlet of the channel is constituted by a plurality of air intake perforations defined in one of the first and second flanges in a circle concentrical with and adjacent the ring seal member and said outlet of the channel is constituted by an annular discharge opening defined by and between the outer peripheral portions of the respective first and second flanges so as to face in a direction counter to the direction of forward run of the vehicle.

9. In an exhaust system for an automobile engine for the discharge of exhaust gases from the engine to the atmosphere, a flexible exhaust coupling comprising:

first and second passage elements each having a tubular opening defined therein, said first passage element being fluid-connected to the engine for receiving the exhaust gases to be discharged through the second passage element;

a ring seal member having a spherical sealing surface defined therein and a carried by one of the first and second passage elements, the other of the first and second passage elements having a mating spherical surface defined therein around the tubular opening thereof;

means for loosely connecting the first and second passage elements together with the spherical sealing surface being permitted to confront the mating spherical surface;

means for resiliently urging the first and second passage elements in a direction close towards each other to permit the spherical sealing surface to gas-tightly and slidingly contact the mating spherical surface thereby constituting a resiliently yieldable joint between the first and second passage elements;

means defining an air channel located exteriorly of the ring seal member for the passage of cooling air to forcibly cool the ring seal member, said air channel having an inlet and an outlet, said inlet and outlet being located and opened at respective regions where a pressure difference can be developed when automobile vehicle moves in one direction such that wind induced by the movement of the vehicle can flow through the channel from the inlet to the outlet by the effect of the pressure differential therebetween;

wherein said first passage element is constituted by a pipe segment and said second passage element is constituted by an end wall of a catalytic converter, wherein said connecting means comprises a flange rigidly mounted on and radially outwardly extending from the pipe segment and at least one pair of elongated connecting members secured at one end to the end wall, and wherein said channel is defined in the end wall with the inlet opening in one end face of the end wall adjacent the pipe segment and the outlet opening in the outer peripheral face thereof.

* * * * *